United States Patent Office 3,337,460
Patented Aug. 22, 1967

3,337,460
ESTERS OF POLYHYDRIC ALKANOLS AND DIBASIC ARYL-FATTY ACIDS
Stephen J. Wayo, Whiting, Ind., assignor to Sinclair Research, Inc., New York, N.Y., a corporation of Delaware
No Drawing. Filed Sept. 3, 1965, Ser. No. 485,077
10 Claims. (Cl. 252—57)

The present invention to novel pour point depressors and to mineral oil compositions having improved pour point characteristics. More particularly, the invention is directed to a pour point depressor for mineral oils which pour point depressor comprises the ester of certain polyhydric alcohols and the reaction product of certain monoolefinically unsaturated fatty acids and aromatic hydrocarbons.

It has been found that oil-soluble polymeric esterification products of certain polyhydric alcohols and the reaction product of a monoolefinically unsaturated fatty acid of about 12 to 24 carbon atoms, preferably about 16 to 24 carbon atoms, with an aromatic hydrocarbon, the mole ratio of said fatty acid to aromatic hydrocarbon being about 1 to 3:1, preferably about 2:1, when added in small amounts to distillate mineral oils substantially reduces the pour point of the mineral oil.

Illustrative of suitable unsaturated fatty acids reacted with the aromatic hydrocarbon of the invention are palmitoleic, oleic, gadoleic, cetoleic, erucic and nervonic acid. The preferred acid is oleic acid because of its effectiveness and availability.

The aromatic hydrocarbon may be chosen from a wide variety of aromatic compounds and includes mono- and polycyclic (fused ring) aromatic hydrocarbon compounds which correspond to the general formula:

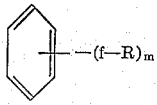

wherein R forms a fused ring aromatic hydrocarbon ring, preferably R is $C_4H_4$; —f— indicates the fused ring relationship (two carbon atoms common to two aromatic nuclei, e.g. as in naphthalene); and $m$ is 0 to 2. The aromatic ring and R may be substituted with other radicals such as alkyl and phenyl groups which do not prevent the desired reaction. Particularly preferred aromatic hydrocarbons are benzene and naphthalene.

The reaction product of the unsaturated fatty acid and aromatic compound can be prepared, for example, by subjecting a mixture of the unsaturated fatty acid and the aromatic hydrocarbon in a mole ratio of about 3:1 at a reaction temperature, for instance, of about 75 to 100° C. in the presence of a Friedel-Crafts catalyst such as aluminum chloride, aluminum bromide, titanium tetrachloride, boron trifluoride etherate, etc. The preferred catalyst is aluminum chloride. The proportions of aromatic fatty acid mixture to catalyst employed may be about 1 to 10 parts of the mixture to 1 part of catalyst or preferably about 2 to 5 parts of the mixture of 1 part of catalyst. If desired, inert diluents for the catalyst, e.g. inert, normally liquid hydrocarbons such as the lower liquid alkanes may also be employed. When employed the amount of liquid diluent is generally present in the range of about 1 to 10 volumes or more, preferably about 2 to 4 volumes of diluent, to 1 volume of the unsaturated fatty acid.

A preferred method of preparing the fatty acid aromatic hydrocarbon reaction product comprises adding the solvent, the unsaturated fatty acid and the aromatic compound to a reaction vessel and stirring the mixture until the aromatic compound is mixed. With continued stirring the Friedel-Crafts catalyst is then added portionwise, the rate of addition being such that the desired reaction is attained and maintained. The resulting reaction product is then solution washed with water, dilute aqueous caustic soda, or by other suitable washing methods. The solvent may or may not be removed. In many cases, it is preferred to employ a solvent that need not be removed, that is, a solvent that will also serve as a reaction medium for the esterification reaction. Among these solvents are the liquid alkanes, for instance of 5 to 12 carbon atoms, including cycloalkanes, or mixtures thereof. A particularly preferred solvent is Udex raffinate which is a paraffinic concentrate in the $C_8$–$C_9$ range derived by extractive distillation with a glycol-water extractive medium from the $C_7$+liquid reformate obtained in platinum-alumina reforming of naphtha feedstocks. The paraffinic concentrate is predominantly isoparaffinic, often containing in admixture about 15–35 weight percent normal paraffins with minor amounts of olefins, aromatics and naphthenes.

The product resulting from the reaction of the unsaturated fatty acid and aromatic compound is a viscous material containing as an active ingredient the aromatic compound starting material substituted with two fatty acid groups. For insance, in the case of naphthalene and oleic acid (which are the preferred reactants of the invention) the reaction product has the following structure:

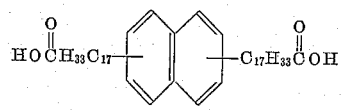

Substantial amounts of the aromatic starting material substituted with a single fatty acid group may also be present and desirable in that it appears to prevent formation of extremely high molecular weight, sometimes oil-insoluble, ester products and to provide a broad range of product molecular weights. Preferably, the reaction product, contains at least about 30% of the diacid, more preferably at least about 50%, based on the total diacids and mono-acids present. Also present in the reaction product mixture may be minor amounts of unreacted materials and/or lighter reaction products.

The diacid aromatic product can be separated from the reaction product mixture, as by vacuum distillation, for esterification but it is preferred to subject the diacid reaction product to esterification while it is in admixture with the mono-acid aromatic product. Thus, in the latter case, the esterification reaction product of the invention is an ester mixture containing diester and polymer ester in proportions corresponding, respectively, to the proportions of the mono-acids and diacids in the intermediate reaction product mixture employed. The mean molecular weight of the polyester-containing reaction product of the invention often falls in the range of about 800 to 1600.

The polyhydric alkanols employed in the esterification of the fatty acid aromatic compounds have 3 to 6 carbon atoms and at least 3 up to about 6 hydroxy groups. Suitable polyhydric alcohols include glycerine, pentanetriol, hexanetriol, pentaerythritol, sorbitol, mannitol, dulcitol, and the like. Particularly preferred is pentaerythritol.

The polyesters, i.e., polymer ester of the diacid intermediate and the polyhydric alkanol, of the present invention can be prepared by directly polymerizing, i.e., esterifying the unsaturated fatty acid aromatic compound reaction product with the polyhydric alcohol in the approximate stoichiometric amounts required for complete esterification, based on the neutralization value of the acid and the hydroxy value of the alcohol. An excess of the acid aromatic reaction product or polyhydric alkanol can be used in the esterification, however, if desired. The esterification reaction is generally conducted with concomitant boiling off of water at reflux temperature. The extent of reaction is sufficient to give a polyester which is soluble in the mineral oil, i.e., there is at least sufficient solubility to dissolve the minor amount of the additive needed to give the desired pour depressing effect. If desired, the reaction can be conducted in the presence of a solvent, for instance, an aromatic hydrocarbon such as xylene, and to provide a better reaction rate I prefer to employ an esterification catalyst. Many of these catalysts are known and include, for instance, hydrochloric acid, sulfuric acid, aliphatic and aromatic sulfonic acids, phosphoric acid, and hydrobromic acid. The preferred reaction is conducted in the presence of about 0.1 to 0.5 weight percent of paratoluene sulfonic acid catalyst, an aromatic hydrocarbon solvent and at a temperature of about 250° to 270° F. while boiling-off water by refluxing.

Among the mineral oil bases which constitute the major proportion of the composition of the invention are liquid distillate petroleum oils boiling primarily above the gasoline range and include, for instance, lubricating oils, diesel fuels, fuel oils, etc. These oils are usually petroleum middle distillates and commonly have relatively high pour points, for instance, at least about −10° F. or higher. The oils can be in their relatively crude state or they can be treated in accordance with well-known commercial methods such as acid or caustic treatment, solvent refining, clay treatment, etc. Fuel oils which can be improved by the condensation products of this invention are, for instance, hydrocarbon fractions boiling primarily in the range of about 300° to 750° F. The fuel oils can be straight run distillate fuel oils or mixtures of straight run fuel oils, naphthas and the like, with cracked distillate stocks. The cracked materials will frequently be about 15 to 70 volume percent of the fuel.

Lubricating oils which can be improved in their pour point characteristics normally have viscosities in the range of about 30 to 3000 SUS at 100° F. These mineral lubricating oils may be derived from a petroleum crude source, whether paraffinic, mixed or naphthenic in type, and may be refined by any of the refining techniques of the petroleum industry.

The amount of the esterification product added to the base oils may vary depending upon the particular base oil, employed, be it a lubricating oil or fuel, the concentration of the active polyester ingredient in the reaction product mixture, etc., but in all cases will be that sufficient to reduce the pour point. In the case of fuel oils, the amounts used often fall in the range of about 0.002 to 1% by weight or more, preferably about 0.015 to 0.1% by weight based on the active polyester ingredient. When the base oil is a lubricating oil, amounts up to 5% by weight are generally used.

In addition to the esterification product of the instant invention the composition may contain as well, other additives commonly incorporated into mineral oils to improve other properties. Illustrative of these additives are antioxidants, corrosion inhibitors, foam inhibitors, detergents, viscosity index improvers, extreme pressure agents, other pour depressors, etc.

The following examples are included to further illustrate the present invention.

*Example I*

282 grams (1.0 mole) of oleic acid were reacted with 128 grams (0.5 mole) of naphthalene to obtain the intermediate product, designated naphthyldistearic acid (NDSA-2). The reaction was carried out in 1050 ml. of Udex raffinate and catalyzed by the addition of four, 33.2 gms. (0.25 mole) portions of anhydrous aluminum chloride at five minute intervals, while stirring vigorously. The reaction was exothermic, the temperature of the reaction mixture increasing from 42.5° C. at the start to 75.5° C. ten minutes after the final addition of aluminum chloride. Copious amounts of HCl were liberated during the addition and thereafter. The mixture was heated to approximately 98° C. (within one half hour), and held at this temperature for an additional 45 minutes. After cooling the reaction mixture to approximately 60° C., the reaction product complex was decomposed by adding 1050 ml. of 10% hydrochloric acid and stirring vigorously. After decomposition of the complex was complete, the aqueous layer was drawn off and the product solution was washed three times with one liter portions of hot (60–70° C.) water. The washed product was filtered through qualitative paper to remove extraneous water. The solvent was removed by evaporation on a steam bath to give a slightly viscous black product with an acid number of 157.8. Calculated combining weight was 355.5, equivalent to a molecular weight of 711 for a dibasic acid. Theoretical acid number and molecular weight are 167.4 and 692, respectively. Product recovery was 85% on charge. A similar procedure was used in the preparation of the reaction product of naphthalene with tall oil fatty acids (NDTFA) and erucic acid (NDEA), and of benzene with oleic acid (PDSA). A product was also prepared with a naphthalene to oleic acid mole ratio of 1:1 (NSA).

On the basis of the calculated molecular weight of 711, 177.7 gm. (0.25 mole) of the naphthyldistearic acid (NDSA-2) and 17 gms. (0.125 mole) of pentaerythritol were added to 1000 ml. of toluene. To this was added 10 gms. of p-toluene sulfonic acid, as the esterification catalyst. The mixture was refluxed with stirring for seven hours, or until the theoretical amount of water was collected in a modified Stark and Dean water trap. The product solution was then cooled enough to transfer it to a 2-liter separatory funnel, where it was washed with dilute sodium bicarbonate solution and water. Product solution recovered was 1470 ml., with a density (75° F.) of 0.865 and a product content (non-volatile solids) of 12.58 gm./100 ml. Yield was 95 wt. percent on charge, or 99% of theoretical. The product is designated as pentaerythrityl naphthyldistearate (PENDS) in the tables below.

Employing a similar esterification procedure, pentaerythritol was esterified with each of the following reaction products. Naphthyl di-tall oil fatty acid (NDTFA), naphthyldierucic acid (NDEA) naphthylstearic acid (NSA), and phenyldistearic acid (PDSA), to produce respectively, pentaerythrityl naphthylditallate (PENDT), pentaerythrityl naphthyl dierucate (PENDE), pentaerythrityl naphthyl stearate (PENS), and pentaerythrityl phenyldistearate (PEPDS). Also, both trimethylolethane and neopentyl glycol were each esterified in a similar manner with the intermediate reaction product NDSA-2 to produce trimethylolethane naphthyldistearate (TMENDS) and neopentyl glycol naphthyldistearate (NGNDS).

The following miscellaneous esters were additionally prepared for purposes of comparison:

(a) Dioctadecyl naphthyldistearate (DONDS) was prepared by first making the intermediate octadecyloleate through trans-esterification of methyloleate with octadecanol in the presence of titanium isopropylate. The intermediate was then reacted with naphthalene, using anhydrous aluminum chloride as catalyst, in the usual manner.

(b) Pentaerythrityl tetrastearate (PETS) was prepared by direct esterification of pentaerythritol with stearic acid.

(c) A mixed ester (PESEDS-2) was prepared by direct esterification of pentaerythritol with a stoichiometric amount of a mixture of sebacic and stearic acids, the acids being in a 1:2 molar ratio in the mixture.

(d) Pentaerythrityl xylylstearate (PEXS) was prepared by substituting mixed xylenes for the Udex raffinate in making the intermediate, thus using it as both aromatic reactant and reaction medium.

All of the intermediate products, (i.e. NDSA-2, NDTFA, NDEA, PDSA, and NSA) esterified as described, although designated in Tables II and III below as either a dibasic acid or a monobasic acid are actually mixtures of the corresponding mono- and dibasic acids.

The physical properties of most of the reaction products and esters thus prepared are summarized in the following Table I.

TABLE I

|  | Acid No. | Sap. No. | I² No. | Mean Mol. Wt. |
|---|---|---|---|---|
| NDSA-2 | 157.8 | | 22.4 | 868 |
| NGNDS | 5.7 | 151.0 | 20.4 | 804 |
| TMENDS | 6.3 | 156.4 | 22.1 | 829 |
| PENDS | 7.6 | 148.9 | 18.6 | 1,282 |
| NDTFA | 175.9 | | 45.2 | 843 |
| PENDT | 3.7 | 144.4 | 45.0 | 916 |
| PENDE | 19.4 | 125.6 | 20.0 | 953 |
| PDSA | 175.0 | | 26.8 | 864 |
| PEPDS | 15.7 | 162.6 | 22.7 | 890 |
| NSA | 151.8 | | 18.2 | 936 |
| PENS | 18.5 | 142.4 | 14.2 | 1,573 |
| PEXS | 108.1 | 151.6 | 9.4 | 967 |
| PEXS | 21.2 | 207.9 | 0.0 | 898 |
| PESEDS-2 | 16.1 | 280.4 | 3.0 | 1,961 |

NOTE.—Inspection tests were obtained on solvent free products. 100 ml. portions of the product solutions were placed on a steam bath and evaporated to obtain solvent free material.

Abbreviations:
NDSA-2—Naphthyldistearic Acid.
NGNDS—Neopentyl Glycol Naphthyldistearate.
TMENDS—Trimethylol Ethane Naphthyldistearate.
PENDS—Pentaerythrityl Naphthyldistearate.
NDTFA—Naphthyl Di-Tall Oil Fatty Acid.
PENDT—Pentaerythrityl Naphthylditallate.
PENDE—Pentaerythrityl Naphthyldierucate.
PDSA—Phenyldistearic Acid.
PEPDS—Pentaerythrityl Phenyldistearate.
NSA—Naphthylstearic Acid.
PENS—Pentaerythrityl Naphthylstearate.
PEXS—Pentaerythrityl Xylylstearate.
PEXS—Pentaerythrityl Tetrastearate.
PESEDS-2—Pentaerythrityl Sebacate Distearate.

*Example II*

Various amounts of the reaction products and esters of Example I were added to a No. 2 Fuel designated A, which analyzed as follows:

| Composition: | No. 2 Fuel A |
|---|---|
| Naphtha | — |
| Water white distillate | 15 |
| Gas oil | 55 |
| Light cycle oil | 30 |
| Kerosene | — |
| Laboratory tests: | |
| Gravity, ° API | 34.6 |
| Flash, ° F., P.M. | 136 |
| Viscosity at 100° F., cs. | 2.548 |
| Cloud point, ° F. | +4 |
| Pour point, ° F. | −5 |
| Olefins, FIA percent | 0.2 |
| Aromatics, FIA percent | 33.2 |
| Sulfur, percent | 0.39 |
| Bromine number | 7.7 |
| Distillation: | |
| IBP, ° F. | 330 |
| 10 percent | 406 |
| 50 percent | 514 |
| 90 percent | 594 |
| E.P. | 632 |
| Recovery, percent | 98 |

The pour points of the samples were taken and are reported in Table II below.

The data of Table II demonstrate the superior pour depressor properties, particularly at lower concentrations possessed by the polyhydric alcohol esterification products of the invention over reaction products of the unsaturated acid and aromatic per se, that is, the unesterified intermediate products. Inspection of the data also show that esters of pentaerythritol and aliphatic acids (e.g. PETS and PESEDS-2) and esters of aromatic acids and either monohydric alcohols (DONDS) or dihydric alcohols (NGNDS) do not provide effective pour depressors.

*Example III*

The ester of pentaerythritol and the reaction product of naphthalene and oleic acid (PENDS) in Example I was compared with two pour depressors, designated X and Y, in Table III. Three different No. 2 fuels designated A, B, and C in Table III below were employed and various concentrations of the additive were incorporated. The

TABLE II

| Product | Product Concentration (wt. percent) | | | | | | | |
|---|---|---|---|---|---|---|---|---|
|  | 0 | 0.0025 | 0.0050 | 0.01 | 0.03 | 0.04 | 0.05 | 0.10 |
| NDSA-2 | −5 | | | | −10 | −50 | −65 | B-80 |
| NGNDS | −5 | | | −10 | −10 | | −10 | |
| TMENDS | −5 | | | −10 | −15 | | B-80 | |
| PENDS | −5 | −10 | −15 | −25 | −60 | | −70 | |
| NDTFA | −5 | | | 0 | | | 0 | 0 |
| PENDT | −5 | | | | −10 | | −10 | |
| NDEA | −5 | | | −10 | −10 | | −15 | B-80 |
| PENDE | −5 | | | −10 | −45 | | −55 | |
| PDSA | −5 | | | −10 | −10 | | −10 | −10 |
| PEPDS | −5 | | | −10 | −70 | | B-80 | |
| NSA | −5 | | | −10 | −20 | | −55 | B-80 |
| PENS | −5 | | | −30 | −50 | | −60 | |
| PEXS | −5 | | | −5 | −5 | | 0 | |
| PETS | −5 | | | −10 | −10 | | −10 | |
| PESEDS-2 | −5 | | | −5 | −5 | | −10 | |
| DONDS | −5 | | | −10 | −10 | | −10 | |

Abbreviations:
NDSA-2—Naphthyldistearic Acid.
NGNDS—Neopentyl Glycol Naphthyldistearate.
TMENDS—Tremethylol Ethane Naphthyldistearate.
PNEDS—Pentaerythrityl Naphthyldistearate.
NDTFA—Naphthyl Di-Tall Oil Fatty Acid.
PENDT—Pentaerythrityl Naphthylditallate.
NDEA—Naphthyldierucic Acid.
PENDE—Pentaerythrityl Naphthyldierucate.
PDSA—Phenyldistearic Acid.
PEPDS—Pentaerythrityl Phenyldistearate.
NSA—Naphthylstearic Acid.
PENS—Pentaerythrityl Naphthylstearate.
PEXS—Pentaerythrityl Xylylstearate.
PETS—Pentaerythrityl Tetrastearate.
PESEDS-2—Pentaerythrityl Sebacate Distearate.
DONDS—Dioctadecyl Naphthyldistearate.

No. 2 fuel designated A is that identified in Example II. Fuels B and C analyzed as follows:

|  | No. 2 Fuel B | No. 2 Fuel C |
|---|---|---|
| Composition: |  |  |
| Naphtha |  |  |
| Water White Distillate |  | 65 |
| Gas Oil | 65 |  |
| Light Cycle Oil | 30 |  |
| Kerosene | 5 |  |
| Laboratory Tests: |  |  |
| Gravity, °API | 33.9 | 37.6 |
| Flash, °F. P.M | 150 | 144 |
| Viscosity at 100° F., cs | 2.183 | 2.586 |
| Cloud Point, °F | +2 | +10 |
| Pour Point, °F | −5 | 0 |
| Olefins, FIA percent | 0.2 |  |
| Aromatics, FIA percent | 30.1 |  |
| Sulfur, percent | 0.34 |  |
| Bromine Number | 4.0 |  |
| Distillation: |  |  |
| IBP, °F | 305 | 336 |
| 10 percent | 380 | 382 |
| 50 percent | 552 | 522 |
| 90 percent | 584 | 590 |
| E.P. | 718 | 620 |
| Recovery, percent | 89 | 98 |

The pour points of the samples were taken and are summarized in Table III below:

TABLE III

| Concn. (Wt. %) | A | | | B | | | C | |
|---|---|---|---|---|---|---|---|---|
|  | PENDS | X | Y | PENDS | X | Y | PENDS | Y |
| 0 | −5 | −5 | −5 | −5 | −5 | −5 | 0 | 0 |
| 0.0025 | −10 |  |  |  |  |  |  |  |
| 0.0050 | −15 |  |  |  |  |  |  |  |
| 0.01 | −25 | −10 | −15 | −15 | −10 | −5 | −5 | −5 |
| 0.03 | −60 | −50 | −40 | −30 | −10 | −15 | −20 | −20 |
| 0.05 | −70 | −60 | −60 | −40 | −40 | −20 | −35 | −20 |

The data show that the additive of the invention possesses pour point depressing characteristics superior to both additives X and Y.

A sample of the same polyester was similarly tested in a Mid-Continent neutral oil having a viscosity of 200 SUS at 100° F. and a viscosity index of 95. The concentrations employed and the pour points of the resulting compositions are as follows:

ASTM POUR POINT OF LUBE OIL WITH "PENDS"

PENDS, wt. percent: Pour point (° F.)
0 _____ +10
0.10 _____ +10
0.30 _____ −10
0.70 _____ −30

*Example IV*

The reaction and esterification procedures of Example I were repeated using the same mole ratios of oleic acid, aromatic and AlCl₃ but substituting benzene for naphthalene. Various amounts of the resulting esterification product of pentaerythritol and the benzene-oleic acid reaction product were added to Fuel C, identified above, the pour points of each of the samples determined. The results were as follows:

Concentration, wt. percent: ASTM pour points, °F.
0.01 _____ −10
0.03 _____ −70
0.05 _____ B−80

I claim:
1. A mineral oil composition having improved pour point properties consisting essentially of a petroleum distillate boiling above the gasoline range having incorporated therein a small amount sufficient to improve the pour point of the petroleum distillate of an oil-soluble polyester of a polyhydric alkanol of 3 to 6 carbon atoms and at least 3 hydroxy groups, and the reaction product of a monoolefinically-unsaturated fatty acid of about 12 to 24 carbon atoms and an aromatic hydrocarbon having the formula:

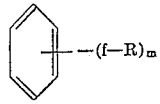

wherein R forms an aromatic hydrocarbon ring, —f— indicates a fused ring relationship and $m$ is 0 to 2, the molar ratio of said fatty acid to said aromatic hydrocarbon being about 2 to 3:1.

2. The composition of claim 1 wherein the monoolefinically-unsaturated fatty acid is oleic acid, the aromatic hydrocarbon is naphthalene and the polyhydric alcohol is pentaerythritol.

3. The composition of claim 1 wherein the petroleum distillate oil is a petroleum distillate fuel oil boiling primarily in the range of about 300 to 750° F.

4. The composition of claim 2 wherein the petroleum distillate oil is a petroleum distillate fuel oil boiling primarily in the range of about 300 to 750° F.

5. The composition of claim 1 wherein the concentration of the oil-soluble polyester is about 0.015% to 0.1% by weight.

6. A mineral oil composition having improved pour point properties consisting essentially of a petroleum distillate boiling above the gasoline range having incorporated therein a small amount sufficient to improve the pour point of the petroleum distillate of an oil-soluble polyester of a polyhydric alkanol of 3 to 6 carbon atoms and at least 3 hydroxy groups, and the reaction product of a monoolefinically-unsaturated fatty acid of about 12 to 24 carbon atoms and an aromatic hydrocarbon having the formula:

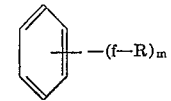

wherein R forms an aromatic hydrocarbon ring, —f— indicates a fuse during relationship and $m$ is 0 to 2, at least about 50% of acid reaction product having a molar ratio of said fatty acid to said aromatic hydrocarbon of 2 to 3:1, the substantial balance of said reaction product having a molar ratio of said fatty acid to said aromatic hydrocarbon of 1:1.

7. The composition of claim 1 wherein the monoolefinically unsaturated fatty acid is oleic acid, the aromatic hydrocarbon is naphthalene, and the polyhydric alcohol is neopentyl glycol, and the mole ratio of stearic acid to naphthalene in the reaction product is about 2:1.

8. The composition of claim 1 wherein the monoolefinically-unsaturated fatty acid is oleic acid, the aromatic hydrocarbon is naphthalene, the polyhydric alcohol is pentaerythritol, and the mole ratio of stearic acid to naphthalene in the reaction product is about 2:1.

9. The composition of claim 1 wherein the monoolefinically unsaturated fatty acid is erucic acid, the aromatic hydrocarbon is naphthalene, the polyhydric alcohol is pentaerythritol, and the mole ratio of erucic acid to naphthalene in the reaction product is about 2:1.

10. The composition of claim 1 wherein the monoolefinically unsaturatde fatty acid is oleic acid, the aromatic hydrocarbon is benzene, the polyhydric alcohol is pentaerythritol and the mole ratio of stearic acid to benzene in the reaction product is about 2:1.

References Cited

UNITED STATES PATENTS

| | | | |
|---|---|---|---|
| 2,211,163 | 8/1940 | Ries | 252—57 |
| 2,318,013 | 5/1943 | Prutton et al. | 252—57 X |
| 2,527,889 | 10/1950 | Moore et al. | 252—57 X |

FOREIGN PATENTS

| | | |
|---|---|---|
| 810,087 | 3/1959 | Great Britain. |
| 884,246 | 12/1961 | Great Britain. |

OTHER REFERENCES

Chemical Abstracts vol. 32, p. 5808 (1938) Roberti et al.

DANIEL E. WYMAN, *Primary Examiner.*

W. CANNON, *Assistant Examiner.*

UNITED STATES PATENT OFFICE
CERTIFICATE OF CORRECTION

Patent No. 3,337,460                                            August 22, 1967

Stephen J. Wayo

It is hereby certified that error appears in the above numbered patent requiring correction and that the said Letters Patent should read as corrected below.

Column 1, line 10, after "invention" insert -- relates --; line 60, for "of", second occurrence, read -- to --; column 3, line 46, for "polyseter" read -- polyester --; column 5, line 35, for "PEXS-" read -- PETS- --; column 7, in the first table, second column, line 19, for "718" read -- 618 --; same table, same column, line 20, for "89" read -- 98 --; column 8, line 54, for "fuse during" read -- fused ring --; line 55, for "acid" read -- said --; column 9, line 1, for "unsaturatde" read -- unsaturated --.

Signed and sealed this 1st day of April 1969.

(SEAL)

Attest:

Edward M. Fletcher, Jr.                                     EDWARD J. BRENNER

Attesting Officer                                                    Commissioner of Patents